United States Patent Office 3,389,124
Patented June 18, 1968

3,389,124
ORGANIC SUBSTANCE STABILIZED WITH AMINO-SUBSTITUTED POLYCYCLIC HETEROCYCLIC INHIBITOR
Allen K. Sparks, Des Plaines, Ill., assignor to Universal Oil Products Company, Des Plaines, Ill., a corporation of Delaware
No Drawing. Original application Jan. 28, 1965, Ser. No. 428,877. Divided and this application July 18, 1966, Ser. No. 565,723
7 Claims. (Cl. 252—51.5)

ABSTRACT OF THE DISCLOSURE

Stabilization of organic substances against deterioration by means of certain amino substituted polycyclic heterocyclic compounds such as 3-(N-cyclohexylamino)-phenoxazine and 2-(N-isopropylamino)-phenothiazine and amino-substituted phenazines.

---

This is a division of copending application Ser. No. 428,877, filed Jan. 28, 1965, and relates to the stabilization of organic substances and more particularly to a novel method of preventing deterioration of the organic substance during storage and/or use. In most organic substances the deterioration is due primarily to oxidation reactions. In many organic substances the deterioration also may be due to heat, radiation or mechanical processes. In some organic substances as, for example, plastics, deterioration also is caused by ultraviolet light absorption. Regardless of the source thereof, deterioration of the organic substance is retarded and/or prevented by the novel method of the present invention.

Stabilization of the organic substance is accomplished in accordance with the present invention by incorporating therein a particular additive. In one embodiment the organic substance is a hydrocarbon distillate. Illustrative hydrocarbon distillates include gasoline, naphtha, kerosene, jet fuel, solvent, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. Still other organic substances which undergo deterioration due to oxidation include synthetic oils as, for example, synthetic lubricating oils, which comprise one or a mixture of aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides and derivatives include polyisopropylene oxide, polyisopropylene oxide diether, polyisopropylene oxide diester, etc. The silicones include methyl silicones, methylphenyl silicones, etc., and the silicates include, for example, tetraisooctyl silicate, diphenyl di-n-dodecyl silane, octadecyl tri-n-decyl silane, polysilylmethylenes, various silane mixtures, silicone-ester blends, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes, such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

Still another organic substance which undergoes deterioration in storage and/or during use is grease. In one method the grease is prepared by compositing a metallic soap with lubricating oil, which oil may be of petroleum origin or synthetically prepared. The grease is classified as lithium base grease, sodium base grease, strontium base grease, aluminum base grease, barium complex grease, calcium complex grease, sodium-calcium grease, calcium-lead grease, etc. The grease also may contain thickening agents such as silica, carbon black, talc, organic modified bentonite, etc., polyacrylates, amides, polyamides, aluminum imides, phthalocyanines, oxanilides, complex aromatic imides and amides, hydantoin derivatives, benzidine dyes, aryl ureas, methyl N-n-octadecyl terephthalamate, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

Another organic substance which undergoes deterioration due to oxidation, U.V. absorption, etc., is plastic. In one embodiment the plastic is a polyolefin including polyethylene, polypropylene, polybutylene, mixed ethylene-propylene polymers, mixed ethylene-butylene polymers, mixed ethylene-propylene-butylene polymers, etc. The solid olefin polymers are used in many applications including electrical insulation, lightweight outdoor furniture, awnings, fibers, etc. Another plastic is polystyrene, which is particularly useful in the manufacture of molded or machined articles. Still another class of plastics is vinyl resin which is derived from monomers such as vinyl chloride, vinyl acetate, vinylidene chloride, etc., such plastic including polyvinyl chloride, copolymers of vinyl chloride with acrylonitrile, methacrylonitrile, vinylidene chloride, alkyl acrylates, alkyl methacrylates, alkyl maleates, alkyl fumarates, polyvinyl butyral, etc., or mixtures thereof. Still other plastics include polycarbonates, phenol-formaldehyde resins, urea-formaldehyde resins, melamine-formaldehyde resins, acryloid plastics, polyacetals, linear or cross-linked polyesters, etc. Still other plastics are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), saran (copolymer of vinylidene chloride and vinyl chloride), rayon, etc.

Another organic substance which undergoes deterioration due to oxidation is rubber, which may be synthetically prepared or naturally occurring. Synthetic rubbers include SBR rubber (copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, cautchouc, balata, gutta percha, etc.

The above are illustrative examples of organic substances which undergo deterioration due to oxygen, U.V.

absorption, etc. It is understood that the novel process of the present invention also may be used with other organic substances which undergo such deterioration.

In one embodiment the present invention relates to a method of stabilizing an organic substance against deterioration which comprises incorporating therein a stabilizing concentration of an amino-substituted polycyclic heterocyclic inhibitor of the following general formula:

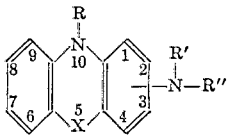

where N is nitrogen, X is selected from the group consisting of oxygen, sulfur and nitrogen, and R, R' and R'' are selected from the group consisting of hydrogen and hydrocarbyl.

In a specific embodiment the present invention relates to a method of stabilizing lubricating oil against oxidative deterioration which comprises incorporating therein a stabilizing concentration of 3-(N-cyclohexylamino)-phenoxazine.

In another specific embodiment the present invention relates to a method of stabilizing rubber against oxidative deterioration which comprises incorporating therein a stabilizing concentration of 2-(N - isopropylamino) - phenothiazine.

Some additives of the present invention are novel compositions of matter and are being so claimed herein.

Referring to the general formula hereinbefore set forth, where X is oxygen, the inhibitor of the present invention is an amino-substituted phenoxazine. When R, R' and R'' are hydrogen atoms, the compound is aminophenoxazine and, while this compound may be used as an additive in accordance with the present invention, a preferred additive is obtained when R is hydrogen and at least one of R' and R'' is a hydrocarbon group. Particularly preferred additives in this embodiment comprise compounds in which R and R' are hydrogen and R'' is an alkyl group of from one and preferably from 3 to about 20 carbon atoms or a cycloalkyl group and preferably cyclohexyl. Illustrative preferred compounds in this embodiment include 3-(N-isopropylamino)-phenoxazine,
3-(N-sec-butylamino)-phenoxazine,
3-(N-sec-pentylamino)-phenoxazine,
3-(N-sec-hexylamino)-phenoxazine,
3-(N-sec-heptylamino)-phenoxazine,
3-(N-sec-octylamino)-phenoxazine,
3-(N-sec-nonylamino)-phenoxazine,
3-(N-sec-decylamino)-phenoxazine,
3-(N-sec-undecylamino)-phenoxazine,
3-(N-sec-dodecylamino)-phenoxazine, etc.,
3-(N-cyclohexylamino)-phenoxazine, etc.

Other illustrative compounds include 3-(N-methylamino)-phenoxazine,
3-(N-ethylamino)-phenoxazine,
3-(N-cyclopropylamino)-phenoxazine,
3-(N-cyclobutylamino)-phenoxazine,
3-(N-cyclopentylamino)-phenoxazine,
3-(N-cycloheptylamino)-phenoxazine,
3-(N-cyclooctylamino)-phenoxazine,
3-(N-cyclononylamino)-phenoxazine,
3-(N-cyclodecylamino)-phenoxazine, etc., similarly substituted compounds in which both R' and R'' are hydrocarbon groups and preferably are selected from the alkyl and cycloalkyl groups hereinbefore set forth, and illustrated, for example, by compounds as 3-(N,N-diisopropylamino)-phenoxazine,
3-(N,N-di-sec-butylamino)-phenoxazine,
3-(N,N-di-sec-pentylamino)-phenoxazine,
3-(N,N-di-sec-hexylamino)-phenoxazine,
3-(N,N-di-sec-heptylamino)-phenoxazine,
3-(N,N-di-sec-octylamino)-phenoxazine,
3-(N,N-di-cyclohexylamino)-phenoxazine, etc.,
3-(N-isopropyl-N-cyclohexylamino)-phenoxazine,
3-(N-sec-butyl-amino-N-cyclohexylamino)phenoxazine, etc., similar compounds in which the hydrocarbylamino group is in the 1, 2 or 4 position on the ring, similar compounds containing two or more hydrocarbylamino groups attached to the same phenyl ring, similar compounds containing one or more hydrocarbylamino groups attached to both of the phenyl rings, etc. In addition to having at least one hydrocarbylamino group attached to one of the phenyl rings, it is understood that one or both of the phenyl rings also may contain other hydrocarbyl or non-hydrocarbyl substituents, the latter being selected from halogen, hydroxyl mercapto, alkoxy, alkoxyamino, and similar compounds in which R is a hydrocarbyl group and preferably is selected from the alkyl and cycloalkyl groups hereinbefore specifically set forth. While generally it is preferred that the alkyl group is of secondary configuration it is understood that the alkyl group may be of normal or tertiary configuration.

Referring again to the general formula hereinbefore set forth, where X is sulfur, the inhibitor of the present invention is an amino-substituted phenothiazine. When R, R' and R'' are hydrogen atoms, the compound is aminophenothiazine and, while this compound may be used as an additive in accordance with the present invention, a preferred additive is obtained when R is hydrogen and at least one of R' and R'' is a hydrocarbon group. Particularly preferred additives in this embodiment comprise compounds in which R and R' are hydrogen and R'' is an alkyl group of from one and preferably from 3 to about 20 carbon atoms or a cycloalkyl group and preferably cyclohexyl. Illustrative preferred compounds in this embodiment include 2-(N-isopropylamino)-phenothiazine,
2-(N-sec-butylamino)-phenothiazine,
2-(N-sec-pentylamino)-phenothiazine,
2-(N-sec-hexylamino)-phenothiazine,
2-(N-sec-heptylamino)-phenothiazine,
2-(N-sec-octylamino)-phenothiazine,
2-(N-sec-nonylamino)-phenothiazine,
2-(N-sec-decylamino)-phenothiazine,
2-(N-sec-undecylamino)-phenothiazine,
2-(N-sec-dodecylamino)-phenothiazine, etc.,
2-(N-cyclohexylamino)-phenothiazine, etc.

Other illustrative compounds include 2-(N-methylamino)-phenothiazine,
2-(N-ethylamino)-phenothiazine,
2-(N-cyclopropylamino)-phenothiazine,
2-(N-cyclobutylamino)-phenothiazine,
2-(N-cyclopentylamino)-phenothiazine,
2-(N-cycloheptylamino)-phenothiazine,
2-(N-cyclooctylamino)-phenothiazine,
2-(N-cyclononylamino)-phenothiazine,
2-(N-cyclodecylamino)-phenothiazine, etc., similarly substituted compounds in which both R' and R'' are hydrocarbon groups and preferably are selected from the alkyl and cycloalkyl groups hereinbefore set forth, and illustrated, for example, by compounds as 2-(N,N-diisopropylamino)-phenothiazine,
2-(N,N-di-sec-butylamino)-phenothiazine,
2-(N,N-di-sec-pentylamino)-phenothiazine,
2-(N,N-di-sec-hexylamino)-phenothiazine,
2-(N,N-di-sec-heptylamino)-phenothiazine,
2-(N,N-di-sec-octylamino)-phenothiazine,
2-(N,N-di-cyclohexylamino)-phenothiazine, etc.,
2-(N-isopropyl-N-cyclohexylamino)-phenothiazine,
2-(N-sec-butylamino-N-cyclohexylamino)-phenothiazine, etc., similar compounds in which the hydrocarbylamino group is in the 1, 3 or 4 position on the ring, similar compounds containing two or more hydrocarbylamino groups attached to the same phenyl ring, similar compounds containing one or more hydrocarbylamino groups attached to both of the phenyl rings, etc. In addition to having at least one hydrocarbylamino group attached to one of the phenyl rings, it is understood that one or both of the phenyl rings also may contain other hydrocarbyl or non-hydrocarbyl substituents, the latter being selected from halogen, hydroxyl, mercapto, alkoxy, alkoxyamino, and similar compounds in which R is a hydrocarbyl group and preferably is selected from the alkyl and cycloalkyl groups hereinbefore specifically set forth. While generally it is preferred that the alkyl group is of secondary configuration, it is understood that the alkyl group may be of normal or tertiary configuration.

Referring again to the general formula hereinbefore set forth where X is nitrogen, the inhibitor of the present invention is an amino-substituted phenazine. When R, R' and R" are hydrogen atoms, the compound is aminophenazine and, while this compound may be used as an additive in accordance with the present invention, a preferred additive is obtained when R is hydrogen and at least one of R' and R" is a hydrocarbon group. Particularly preferred additives in this embodiment comprise compounds in which R and R' are hydrogen and R" is an alkyl group of from one and preferably from 3 to about 20 carbon atoms or a cycloalkyl group and preferably cyclohexyl. Illustrative preferred compounds in this embodiment include 2-(N-isopropylamino)-phenazine,
2-(N-sec-butylamino)-phenazine,
2-(N-sec-pentylamino)-phenazine,
2-(N-sec-hexylamino)-phenazine,
2-(N-sec-heptylamino)-phenazine,
2-(N-sec-octylamino)-phenazine,
2-(N-sec-nonylamino)-phenazine,
2-(N-sec-decylamino)-phenazine,
2-(N-sec-undecylamino)-phenazine,
2-(N-sec-dodecylamino)-phenazine,
2-(N-cyclohexylamino)-phenazine.

Other illustrative compounds include 2-(methylamino)-phenazine,
2-(N-ethylamino)-phenazine,
2-(N-cyclopropylamino)-phenazine,
2-(N-cyclobutylamino)-phenazine,
2-(N-cyclopentylamino)-phenazine,
2-(N-cycloheptylamino)-phenazine,
2-(N-cyclooctylamine)-phenazine,
2-(N-cyclononylamino)-phenazine,
2-(N-cyclodecylamino)-phenazine, etc., similarly substituted compounds in which both R' and R" are hydrocarbon groups and preferably are selected from the alkyl and cycloalkyl groups hereinbefore set forth, and illustrated, for example, by compounds as 2-(N,N-diisopropylamino)-phenazine,
2-(N,N-di-sec-butylamino)-phenazine,
2-(N,N-di-sec-pentylamino)-phenazine,
2-(N,N-di-sec-hexylamino)-phenazine,
2-(N,N-di-sec-heptylamino)-phenazine,
2-(N,N-di-sec-octylamino)-phenazine,
2-(N,N-di-cyclohexylamino)-phenazine, etc.,
2-(N-isopropyl-N-cyclohexylamino)-phenazine,
2-(N-sec-butylamino-N-cyclohexylamino)-phenazine, etc., similar compounds in which the hydrocarbylamino group is in the 1 position on the ring, similar compounds containing two or more hydrocarbylamino groups attached to the same phenyl ring, similar compounds containing one or more hydrocarbylamino groups attached to both of the phenyl rings, etc. In addition to having at least one hydrocarbylamino group attached to one of the phenyl rings, it is understood that one or both of the phenyl rings also may contain other hydrocarbyl or non-hydrocarbyl substituents, the latter being selected from halogen, hydroxyl mercapto, alkoxy, alkoxyamino, and similar compounds in which R is a hydrocarbyl group and preferably is selected from the alkyl and cycloalkyl groups hereinbefore specifically set forth. While generally it is preferred that the alkyl group is of secondary configuration, it is understood that the alkyl group may be of normal or tertiary configuration.

The inhibitors of the present invention may be prepared in any suitable manner. For example, 3-(N-alkylamino) phenoxazine may be prepared by first reacting orthoaminophenol with a dinitrophenyl halide, preferably 2,4-dinitrophenyl chloride, to form a dinitrophenyl hydroxyphenylamine as, for example, 2,4-dinitro-2'-hydroxydiphenylamine. This reaction is readily effected by refluxing the reactants in the presence of a suitable solvent. A satisfactory solvent is an alcohol and particularly ethanol. When the latter is used as the solvent, the refluxing temperature is of the order of 80° C. It is understood that the refluxing temperature will vary with the particular solvent employed. The reaction also advantageously is effected in the presence of sodium acetate or other suitable compound to accept the hydrogen chloride released in the reaction. It is understood that the aminophenol may contain substituents preferably being selected from those hereinbefore specifically set forth. Similarly, it is understood that the dinitrochlorobenzene also may contain hydrocarbyl substituents attached thereto.

The 2,4-dinitro-2'-hydroxydiphenylamine or similar compound, prepared in the above manner, is then reacted in any suitable manner to effect ring closure. This reaction is readily effected by heating the reactant at a suitable temperature in the presence of a suitable alkali and also preferably in the presence of a solvent. For example, 2,4-dinitro-2'-hydroxydiphenylamine is heated at a temperature of 90°–100° C. for eight hours in the presence of sodium methoxide and dimethyl sulfoxide. The resultant 3 - nitro phenoxazine is recovered as a solid product and may be recrystallized from a suitable solvent in order to purify the product. The product then is subjected to reductive alkylation with a suitable ketone including, for example, acetone, methylethyl ketone, ethylpropyl ketone, methylheptyl ketone, ethylamyl ketone, diheptyl ketone, cyclohexanone, etc. The reductive alkylation is effected at a temperature of from about 100° to about 250° C. and a hydrogen pressure of from about 5 to about 200 atmospheres in the presence of a reductive alkylation catalyst. A preferred catalyst comprises a composite of alumina and from about 0.1% to about 5% by weight of platinum. Other catalysts include those containing nickel, cobalt, palladium, molybdenum, etc. The reductive alkylation preferably is effected in the presence of an excess of ketone and thus the mol ratio of ketone to amino heterocyclic compound will range from 1.5:1 and preferably from 2:1 and still more preferably from 2.5:1 to 20:1 or more. When both R' and R" in the formula hereinbefore set forth are alkyl groups the proportion of ketone preferably is at least 3:1. Here again the final product may be purified by recrystallization from a suitable solvent. It is understood that other amino-substituted phenoxazines may be prepared in substantially the same manner as hereinbefore described or in any other suitable manner. When the alkyl substituent is of normal configuration, an aldehyde is used in the reductive alkylation. When a tertiary alkyl substituent is desired, a tertiary alcohol is used for alkylation.

Amino-substituted phenothiazine is prepared in any suitable manner. In one method a dinitrochlorobenzene is reacted with o-aminothiophenol preferably in the presence of a suitable solvent as, for example, ethanol and in the presence of a suitable hydrogen chloride acceptor as, for example, sodium acetate. The reaction product which will comprise, for example, 2,4-dinitro-2'-aminodiphenyl sulfide is then subjected to ring closure by heating in the presence of sodium acetate and a suitable solvent such as dimethyl sulfoxide. For example, 2-nitrophenothiazine was prepared by heating 2,4-dinitro-2'-aminodiphenylsulfide in admixture with sodium acetate and dimethyl sulfoxide at about 90° C. for five hours under a stream of nitrogen. After cooling and filtering, the recovered solid was washed with hot water and dried. 2-nitrophenothiazine was recovered as a solid and then is subjected to reductive alkylation with a suitable ketone in the manner hereinbefore set forth. In another method this compound is prepared by the fusion of aminodiphenylamine with sulfur.

Similarly, amino-substituted phenazine is prepared in any suitable manner. In one method it is prepared by heating a mixture of dinitrobenzene, aniline and sodium hydroxide at 140° C. The amino phenazine then is subjected to reductive alkylation in substantially the same manner as hereinbefore set forth. It is understood that any suitable method of preparing these compounds may be used in accordance with the present invention.

As hereinbefore set forth, the product generally is recovered as a solid and may be utilized as such or dissolved in a suitable solvent. Any suitable solvent may be used and will be one which will be satisfactory for use in the organic substance to be stabilized. Thus, for example, when the organic substance is a hydrocarbon, the solvent may comprise an aromatic hydrocarbon including benzene, toluene, xylene, cumene, etc., or mixtures thereof.

The additive of the present invention is incorporated in the organic substance in a concentration sufficient to effect the desired stabilization. The specific concentration will depend upon the particular organic substance being stabilized and thus the concentration may be within the range of from about 0.001% to about 25% by weight of the organic substance. In most cases, however, the concentration will be within the range of from about 0.001% to about 25% by weight of the organic substance. In most cases, however, the concentration will be within the range of from about 0.01% to about 5% by weight of the organic substance.

In many applications it may be advantageous to utilize the additive of the present invention in conjunction with other additives. For example, in the stabilization of plastics, a phenolic antioxidant, particularly 2,6-di-tert-butyl-4-methyl phenol or 2,4-dimethyl-6-tertiary-butyl phenol may be used. Other phenolic inhibitors or amino type inhibitors also may be used. When used in rubber, it also is desirable to incorporate an antiozonant in the rubber, preferred antiozonants being N,N'-di-sec-octyl-p-phenylenediamine, N-phenyl-N'-isopropyl-p-phenylenediamine, N-phenyl-N'-sec-octyl-p-phenylenediamine, etc.

The additive of the present invention is incorporated in the organic substance in any suitable manner and, when desired, may be premixed with the other additive or additives and the mixture added to the organic substance in one step. When the additive or mixture is to be incorporated into a plastic, resin or the like, it may be added to the hot melt, with stirring, generally in a Banbury mixer, extruder or other device. Incorporation of the additive in a liquid preferably is accompanied by intimate mixing to effect distribution of the additive throughout the liquid. When the additive is added to a multicomponent mixture as, for example, grease, it may be added to one of the components and, in this manner, incorporated into the final mixture or it may be added directly into the final mix.

The following examples are introduced to illustrate further the novelty and utility of the present invention but not with the intention of unduly limiting the same.

Example I

The compound of this example is 3-(N-isopropylamino)-phenoxazine and was prepared as follows. While 2,4-dinitro-2'-hydroxydiphenylamine, for use as a reactant in the above preparation, may be obtained from any suitable source, it was prepared by rapidly stirring a solution of 218 g. (2.0 moles) of o-aminophenol and 185 g. (2.25 moles) of sodium acetate in 2,000 cc. of ethanol. To this solution there was added 405 g. (2.0 moles) of 2,4-dinitrochlorobenzene over a period of 30 minutes and at a rate to maintain reflux. The mixture was maintained at refluxing conditions (about 80° C.) for two hours after which the reaction mixture was cooled to 10° C. and filtered to give 497 g. of a red-brown solid. The solid was purified by recrystallization from 6600 cc. of ethanol, to yield 351 g. of 2,4-dinitro-2'-hydroxydiphenylamine as a solid having a melting point of 200.5–202° C.

*Analysis.*—Calculated for $C_{12}H_9N_3O_5$: C, 52.37%; H, 3.29%; N, 15.27%. Found: C, 52.78%; H, 3.28%; N, 15.27%.

The 2,4-dinitro-2'-hydroxydiphenylamine, prepared in the above manner, was subjected to ring closure by dissolving 206 g. (0.75 mole) thereof in 500 cc. of dimethyl sulfoxide. A slurry of 43 g. (0.75 mole) of sodium methoxide in 200 cc. of dimethyl sulfoxide was added and the mixture was heated at 90°–100° C. for a period of eight hours. Following completion of the reaction, the reaction mixture was cooled, diluted with 1,000 cc. of water and filtered to yield 152 g. of a solid product having a melting point of 200–201° C. The product was purified by recrystallization from acetone to give 3-nitrophenoxazine having a melting point of 200–201° C.

*Analysis.*—Calculated for $C_{12}H_8N_2O_3$: C, 63.16%; H, 3.53%; N, 12.27%. Found: C, 63.46%; H, 4.13%; N, 12.61%.

The 3-nitrophenoxazine, prepared in the above maner, was subjected to reductive alkylation with acetone to form 3-(N-isopropylamino)-phenoxazine. The reductive alkylation was effected by heating 0.25 mole of 3-nitrophenoxazine with 2.5 moles of acetone at 100° C. in the presence of hydrogen and alumina-platinum catalyst. The reductive alkylation product was 3-(N-isopropylamino)-phenoxazine and was recovered as a solid having a melting point of 131° C.

*Analysis.*—Calculated for $C_{15}H_{16}N_2O$: Basic N, 5.83%. Found: 5.72%.

Example II

The compound of this example is 3-(N-cyclohexylamino)-phenoxazine and was prepared by the reductive alkylation of 3-nitrophenoxazine, prepared as described in Example I, with cyclohexanone. The reductive alkylation was effected by heating 0.25 mole of 3-nitro phenoxazine with 2.5 moles of cyclohexanone at 100° C. in the presence of hydrogen and alumina-platinum catalyst. 3-(N-cyclohexylamino)-phenoxazine was recovered as a solid having a melting point of 153° C.

*Analysis.*—Calculated for $C_{18}H_{20}N_2O$: N, 5.00%. Found: 4.86%.

Example III

The compound of this example is 2-(N-isopropylamino)-phenothiazine. For use as a reactant in the preparation of this compound, 2,4-dinitro-2'-aminodiphenyl sulfide was prepared by dissolving 202 g. (1.0 mole) of 2,4-dinitrochlorobenzene and 150 g. (1.2 mole) of o-aminothiophenol in 650 cc. of formula 30 alcohol (mostly ethanol). The mixing was done at room temperature but the temperature rose to 58° C. When the temperature leveled off, 192 g. (1.5 mole) of sodium acetate in incremental portions was added. The temperature rose to 65° C., with the precipitation of an orange solid. The mixture was heated at 60–65° C. for an additional 2.5 hours, after which the mixture was allowed to cool and then was filtered and washed with additional formula 30 alcohol and dried. 2,4-dinitro-2'-aminodiphenyl sulfide was recovered as a yellow solid having a melting point of 149–150° C.

*Analysis.*—Calculated for $C_{12}H_9N_3O_4S$: S, 11.0%. Found: S, 11.3%.

The 2,4-dinitro-2'-aminodiphenyl sulfide, prepared in the above manner, was subjected to ring closure by dissolving 30 g. (0.1 mole) thereof and 16 g. (0.2 mole) of sodium acetate in 200 cc. of dimethyl sulfoxide, stirring and heating the mixture at 90° C. for five hours under a stream of nitrogen. After cooling, the solid was filtered and the filtrate was denatured with water until solids appeared. The recovered solids were washed with hot water and dried. 2-nitrophenothiazine was recrystallized from formula 30 alcohol to give a violet-black solid having a melting point of 205° C.

Analysis.—Calculated for $C_{12}H_8N_2O_2S$: S, 13.1%. Found: S, 13.3%.

The 2-nitrophenothiazine, prepared in the above manner, was subjected to reductive alkylation with acetone in substantially the same manner as described in Example I. The reductive alkylation produce [2-(N-cyclohexylamino)-phenothiazine] was recovered as a solid.

Example IV

The compound of this example is 2-(N-cyclohexylamino)-phenothiazine and is prepared by the reductive alkylation of 2-nitrophenothiazine, prepared as described in Example III, with cyclohexanone. The reductive alkylation is effected using 1 mole proportion of 2-nitrophenothiazine with 3.0 mole proportions of cyclohexanone. The reaction is conducted at a temperature of about 125° C. in the presence of hydrogen and alumina-platinum catalyst. Following completion of the reaction and separation of the recovered product, 2-(N-cyclohexylamino)-phenothiazine is recovered as a solid.

Example V

The compound of this example is 2-(N-isopropylamino)-phenazine and is prepared by the reductive alkylation of 2-nitrophenazine with acetone. The reductive alkylation is effected by heating 1 mole proportion of 2-nitrophenazine with 3 mole proportions of acetone at a temperature of 100° C. in the presence of hydrogen and alumina-platinum catalyst. Following completion of the reaction, the products are separated to recover 2-(N-isopropylamino)-phenazine as a solid product.

Example VI

The compound of this example is 2-(N-sec-octylamino)-phenazine and is prepared by the reductive alkylation of 2-nitrophenazine with ethyl amyl ketone. The reductive alkylation is effected by reacting 1 mole proportion of 2-nitrophenazine with 3 mole proportions of ethyl amyl ketone in the presence of hydrogen and alumina-platinum catalyst. After completion of the reaction, 2-(N-sec-octylamino)-phenazine is recovered as a solid product.

Example VII

As hereinbefore set forth the compounds of the present invention are used as additives to prevent oxidation of organic substances. In this example, 3-N-cyclohexylamino)-phenoxazine, prepared as described in Example II, was utilized as an additive in commercial lubricating oil. A sample of this oil without additive was obtained and is stated to have the following properties.

TABLE I

| | |
|---|---|
| Gravity, ° API | 30.7 |
| Flash, Cleveland open cup, ° F. | 390 |
| Firer, Cleveland open cup, ° F | 415 |
| Pour point, ° F. | −10 |
| Viscosity S.U.S.: | |
| At 100° F. | 120 |
| At 210° F. | 41 |
| Viscosity index | 97.5 |

The lubricating oil was evaluated in accordance with an Oxygen Stability Test in which a sample of the lubricating oil is placed in a closed glass container having glass tubes projecting therein. One of the glass tubes reaches to the bottom of the container and air is blown therethrough at a rate of 5 liters of air per hour. The container is placed in a bath maintained at 400° F. The sample of lubricating oil is examined after 24 hours for acidity, isooctane insolubles and the change in viscosity. The isooctane insolubles measures the amount of heavier material formed during the test. The change in viscosity also determines deleterious reactions occurring during the test.

For comparative purposes, a sample of the lubricating oil without additive was evaluated in the same manner as the control sample. Another sample of the lubricating oil containing 1% by weight of 3-(N-cyclohexylamino)-phenoxazine was evaluated in the same manner. The results of these evaluations are reported in the following table.

TABLE II

| Run No. | Additive | Acidity, meq./gm. | Isooctane Insolubles, Percent | Viscosity, Kinematic | | |
|---|---|---|---|---|---|---|
| | | | | Before | After | Percent Change |
| 1 | None | 0.033 | 0.84 | 13.800 | 15.660 | 13.5 |
| 2 | 3-(N-cyclohexylamino) phenoxazine. | 0.015 | 0.27 | 14.540 | 14.410 | −1 |

From the data in the above table, it will be seen that, after 24 hours of exposure to oxygen at 400° F., the lubricating oil without additive (Run No. 1) underwent oxidative deterioration as indicated by the acidity, percent insolubles and increase in viscosity. On the other hand, the sample of lubricating oil containing the additive (Run No. 2) was stabilized as evidenced by a comparison of the properties set forth above with those of the control sample.

Example VIII

A sample of 3-(N-cyclohexylamino)-phenoxazine, prepared as described in Example II, also was evaluated as an additive in a synthetic lubricating oil. The synthetic lubricating oil used in this example is dioctyl sebacate and is marketed commercially under the trade name of "Plexol 201." The evaluation was made in a method similar to that described in Example VII. The same type of apparatus was used, in which the lubricating oil was placed in a glass container and maintained at a temperature of 400° F. with air being blown therethrough. In this evaluation the air was blown at a rate of 10 litres of air per hour. The evaluations were continued until the oil reached an acid number of 5.

A sample of the synthetic lubricating oil without additive, when evaluated in the above manner, reached an acid number of 5 in about 9 hours. In contrast, a sample of the synthetic lubricating oil containing about 1% by weight of 3-(N-cyclohexylamino)-phenoxazine did not reach an acid number of 5 until after about 48 hours of evaluation in the above manner.

In addition, coupons of different metals were placed in the glass container in order to determine whether the additive retarded corrosion of metals during the evaluation. The gain in weight of the different metal coupons after exposure to oxygen and heat in the above manner are: copper, 0.0102 g., steel, 0.0064 g., silver, 0.0038 g. and lead, 0.0115 g. From these data it will be seen that the additive was effective in retarding corrosion of the metal.

Example IX

The compounds of the present invention also were evaluated as additives in rubber. The rubber used in this example is a natural rubber tread stock of the following recipe.

TABLE III

| Components: | Parts by weight |
| --- | --- |
| Smoked sheet | 100.0 |
| Carbon black | 45.0 |
| Stearic acid | 3.0 |
| Zinc oxide | 3.1 |
| Sulfur | 2.5 |
| Santocure | 0.75 |
| Additive, when employed | 2.0 |

After curing the different rubber samples were cut into slabs of 6 inches square and 0.075 inch thick. Dumbbell specimens were cut from the slabs and these were suspended in large covered test tubes. Two long tubes are inserted in the stopper of the test tube, one positioned several inches higher than the other, the latter extending to the bottom of the sample tube. This serves to admit fresh cooler air, while gently replacing the heated air by exhausting the same through the higher tube. This test tube aging procedure corresponds to ASTM D-52T.

The following table reports the results of evaluating a sample of the rubber without inhibitor (Run No. 3) and samples of the rubber containing 2% by weight of different additives of the present invention. In Run No. 4, the additive is 3-(N-isopropylamino)-phonoxazine, prepared as described in Example I. In Run No. 5, the additive is 3-(N-cyclohexylamino)-phenoxazine, prepared as described in Example II. In Run No. 6, the additive is 2-(N-isopropylamino)-phenothiazine, prepared as described in Example III.

TABLE IV

| Run No. | Additive | Days Aged at 90° C. | Modulus, p.s.i. 200% | Modulus, p.s.i. 300% | Tensile Strength, p.s.i. |
| --- | --- | --- | --- | --- | --- |
| 3 | None | 0 | 1,605 | 2,650 | 3,810 |
|  |  | 1 | 1,675 | 2,790 | 2,943 |
|  |  | 2 | 1,445 |  | 2,180 |
| 4 | 3-(N-isoproplyamino) phenoxazine. | 0 | 1,725 | 2,845 | 3,005 |
|  |  | 1 | 2,170 | 3,315 | 3,400 |
|  |  | 2 | 2,240 |  | 2,900 |
| 5 | 3-(N-cyclohexylamino) phenoxazine. | 0 | 1,760 | 2,910 | 4,075 |
|  |  | 1 | 2,035 | 3,100 | 3,175 |
|  |  | 2 | 2,150 |  | 2,590 |
| 6 | 2-(N-isopropylamino) phenothiazine. | 0 | 1,425 |  | 3,935 |
|  |  | 1 |  |  |  |
|  |  | 2 | 2,160 |  | 2,630 |

From the data in the above table, it will be seen that the additives of the present invention served to retard deterioration of the rubber as evidenced by the higher moduli and the higher tensile strength of the samples containing the additives as compared to the control sample.

Example X

The additives of the present invention also were evaluated in the rubber in accordance with Flex-Resistance test ASTM D813–52T. In this method samples of the rubber stock to be tested are prepared in special molds to form specimens 1" by 6" by ¼", containing semi-circular grooves of 0.095" radius across the width of the sample, equidistant from the ends. The samples are pierced so as to locate a 2 mm. slit in the center of the semi-circular groove and equidistant from each side. These samples are positioned ⅛" apart in the jaws of a DeMattia flexing machine, in which the stock is adjusted so that the grips approach each other to a distance of ¾" and separate to a distance of 3". The machine operates at a rate of 300 cycles per minute. The width of the crack in the sample was measured after a preselected number of flexes.

In all cases, the additive, when employed, was used in a concentration of 2% by weight. The rubber formulation is the same as described in Example IX. The additives are those prepared according to Examples I, II and III. Representative results of these evaluations are shown in the following table.

TABLE C

| Flexes, 10³ | Crack Size, mm., Additive | | | |
| --- | --- | --- | --- | --- |
|  | None | Ex. I | Ex. II | Ex. III |
| 2 | 3.2 | 2.0 | 2.2 | 2.0 |
| 10 | 6.7 | 3.4 | 5.3 | 6.1 |
| 100 | 17.0 | 9.5 | 13.3 | 14.5 |
| 200 | 20.8 | 14.1 | 13.7 | 14.6 |

From the data in the above table, it will be seen that the growth of the cracks in the samples of rubber containing the additives was less than in the samples without inhibitor. This demonstrates the property of the additives of the present invention to retard flex cracking of the rubber.

Example XI

The compounds of the present invention are used as additives in grease. The additive is incorporated in a concentration of 0.5% by weight in a commercial Mid-Continent lubricating oil having an S.A.E. viscosity of 20. Approximately 92% of the lubricating oil is mixed with approximately 8% of lithium stearate. The mixture is heated to about 230° C. with constant agitation. Subsequently, the grease is cooled, while agitating to approximately 120° C., and then the grease is further cooled slowly to room temperature.

The stability of the grease is tested in accordance with ASTM D942 method, in which a sample of the grease is placed in a bomb and maintained at a temperature of 121° C. Oxygen is charged to the bomb, and the time required for a drop of five pounds pressure is taken as the induction period.

A sample of the grease without additive will reach the induction period in about four hours. A sample of the grease containing 2-(N-sec-octylamino)-phenazine, prepared as described in Example VI, will not reach the induction period in more than 100 hours.

I claim as my invention:

1. Organic substance subject to oxidative deterioration containing, as an inhibitor against said deterioration, a stabilizing concentration of an amino-substituted polycyclic heterocyclic inhibitor of the following general formula:

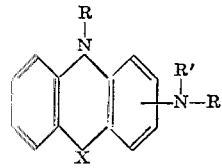

where N is nitrogen, X is selected from the group consisting of oxygen and nitrogen, and R, R' and R" are selected from the group consisting of hydrogen and hydrocarbyl, at least one of R' and R" being hydrocarbyl.

2. The organic substance of claim 1 wherein the inhibitor is N-hydrocarbylamino-phenoxazine.

3. The organic substance of claim 1 being lubricating oil and said inhibitor being 3-(N-alkylamino)-phenoxazine.

4. The organic substance of claim 1 being lubricating oil and said inhibitor being 3-(N-cyclohexylamino)-phenoxazine.

5. The organic substance of claim 1 being rubber and said inhibitor being 3-(N-alkylamino)-phenoxazine.

6. The organic substance of claim 1 being rubber and said inhibitor being 3-(N-cyclohexylamino)-phenoxazine.

7. The organic substance of claim 1 wherein the inhibitor is N-hydrocarbylamino-phenazine.

(References on following page)

References Cited

UNITED STATES PATENTS

| | | | |
|---|---|---|---|
| 1,809,798 | 6/1931 | Clifford | 260—800 |
| 2,006,756 | 7/1935 | Bartram | 44—63 |
| 2,062,201 | 11/1936 | Bartram | 252—51.5 X |
| 2,308,691 | 1/1943 | Hughes | 252—47 |
| 2,813,828 | 11/1957 | Woods et al. | 252—33.3 |
| 3,047,572 | 7/1962 | Craig | 260—243 |
| 3,078,230 | 2/1963 | Cyba | 252—42.1 |
| 3,102,871 | 9/1963 | Spacht | 44—63 X |

OTHER REFERENCES

Cole et al.—Am. Chem. Soc. Petroleum Div. Preprint, vol. 1, No. 4, pp. 102–114 (1956).

Murphy et al.—Ind. Eng. Chem., December 1950, pp. 2479 to 2489.

DANIEL E. WYMAN, *Primary Examiner.*

W. H. CANNON, *Assistant Examiner.*